(12) United States Patent
Kim et al.

(10) Patent No.: US 7,817,649 B2
(45) Date of Patent: Oct. 19, 2010

(54) SESSION INVITATION METHOD AND SYSTEM

(75) Inventors: Young-Ae Kim, Gyeonggi-Do (KR);
Kang-Suk Huh, Gyeonggi-Do (KR);
Kyung-Ae Yoon, Gyeonggi-Do (KR);
Sung-Bum Choi, Seoul (KR);
Jong-Sook Kim, Seoul (KR); Kyu-Sung Han, Seoul (KR)

(73) Assignee: LG Electronics Inc., Seoul (KR)

( * ) Notice: Subject to any disclaimer, the term of this patent is extended or adjusted under 35 U.S.C. 154(b) by 782 days.

(21) Appl. No.: 11/231,464

(22) Filed: Sep. 20, 2005

(65) Prior Publication Data

US 2006/0067287 A1 Mar. 30, 2006

Related U.S. Application Data

(60) Provisional application No. 60/611,787, filed on Sep. 20, 2004.

(30) Foreign Application Priority Data

Jan. 14, 2005 (KR) .................. 10-2005-0003900

(51) Int. Cl.
*H04L 12/28* (2006.01)
(52) U.S. Cl. .................. 370/410; 709/206; 370/522
(58) Field of Classification Search .......... 370/230, 370/260, 261, 389, 395.2, 410, 522; 455/412–519; 709/217–236
See application file for complete search history.

(56) References Cited

U.S. PATENT DOCUMENTS

| 6,934,752 | B1 * | 8/2005 | Gubbi .................. 709/225 |
| 7,427,024 | B1 * | 9/2008 | Gazdzinski et al. ......... 235/384 |
| 2003/0055981 | A1 | 3/2003 | Requena et al. |
| 2003/0139172 | A1 | 7/2003 | Lampela et al. |
| 2004/0181584 | A1 * | 9/2004 | Rosen et al. ............. 709/206 |
| 2005/0083909 | A1 * | 4/2005 | Kuusinen et al. .......... 370/352 |
| 2005/0237931 | A1 * | 10/2005 | Punj et al. ............... 370/229 |
| 2009/0013045 | A1 * | 1/2009 | Maes et al. .............. 709/205 |

FOREIGN PATENT DOCUMENTS

| KR | 10-2003-0028106 A | 4/2003 |
| KR | 10-2004-0019201 A | 3/2004 |
| KR | 10-2004-0099916 A | 12/2004 |

* cited by examiner

*Primary Examiner*—Seema S Rao
*Assistant Examiner*—Wanda Z Russell
(74) *Attorney, Agent, or Firm*—Lee, Hong, Degerman, Kang & Waimey

(57) ABSTRACT

Session invitation method and system in a PTx communication system are disclosed. For session invitation, an inviting terminal adds first media information corresponding to session information in an invitation message and transmits it or transmits it through an RTP. Then, the first media information received by an invited terminal is checked and an invitee determines whether to accept the invitation before joining the session. When the invitation is rejected, the invited terminal adds second media information corresponding to a reason for rejection in a reject message and transmits it, or transmits it through the RTP.

16 Claims, 8 Drawing Sheets

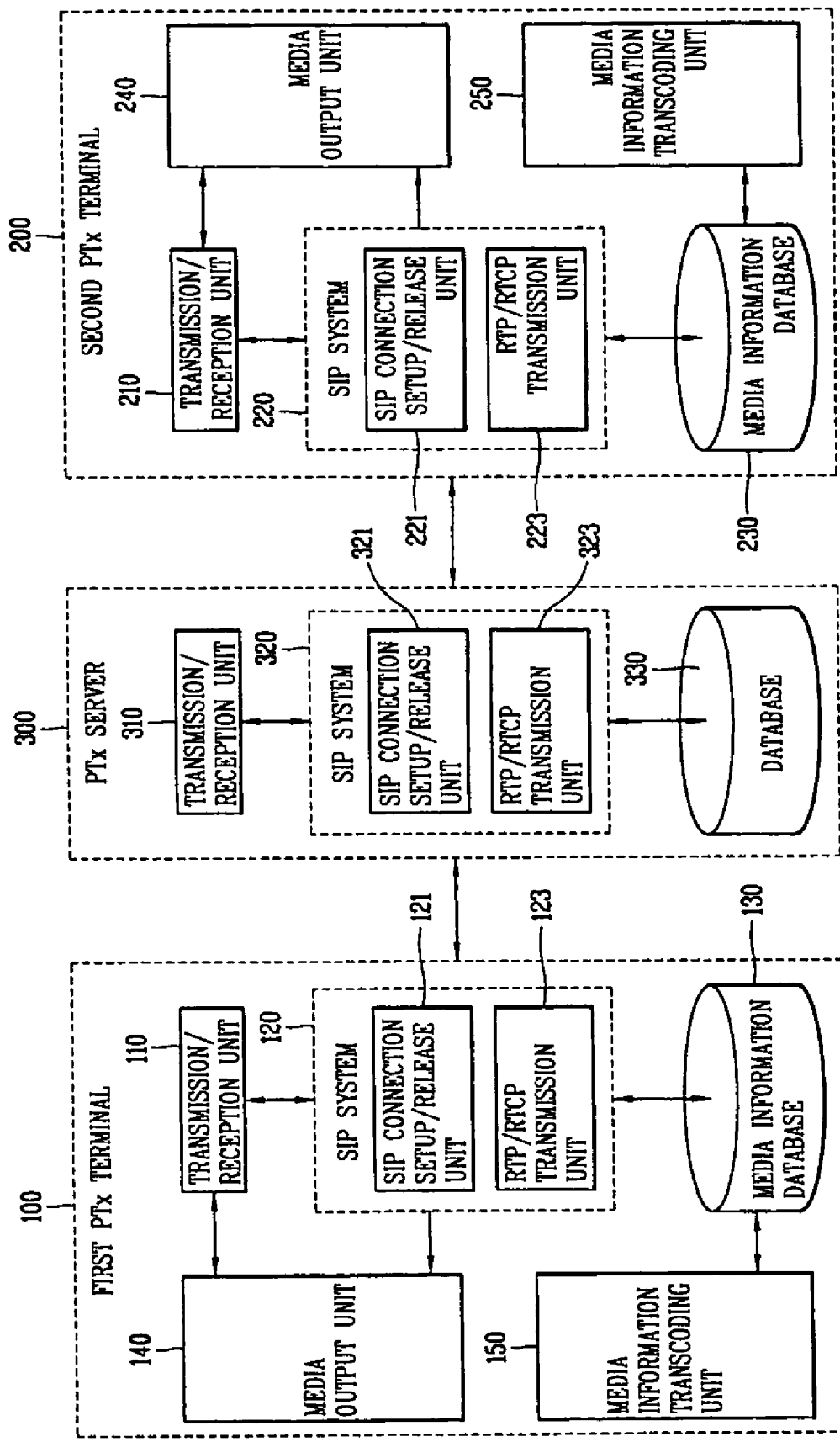

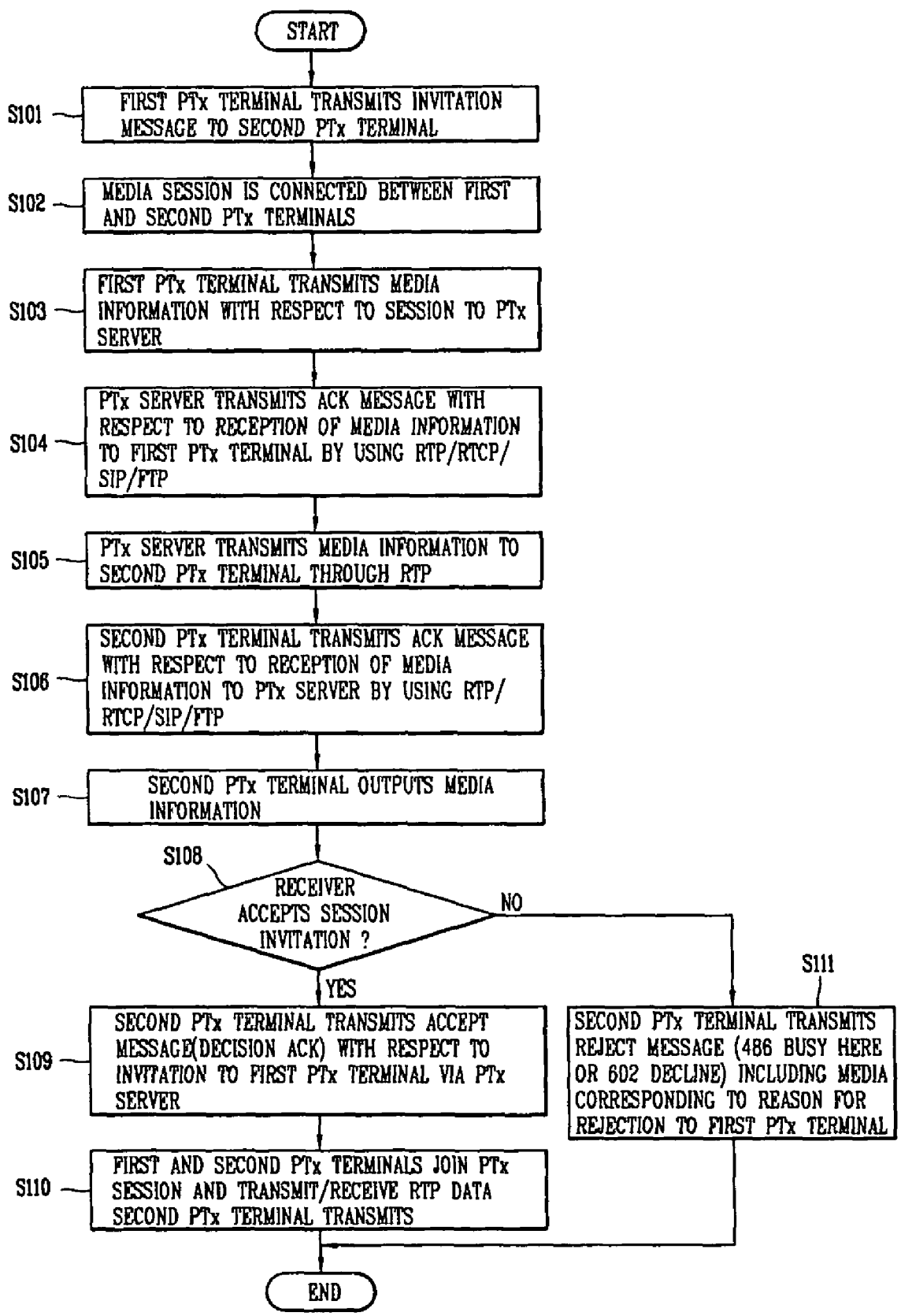

```
<?xml version="1.0"?>
<gts-info xmlns="http://sktims.net/cpim_cpim_pidf/gts_info">
    <type>ABSENCE_MES</type>
    <text>"NOW IN A MEETING. CALL ME IN 30 MINUTES."</text>
</gts-info>
```

SESSION INVITATION METHOD AND SYSTEM

CROSS-REFERENCE TO RELATED APPLICATIONS

This application claims the benefit of U.S. Provisional Application Ser. No. 60/611,787 filed on Sep. 20, 2004. Pursuant to 35 U.S.C. §119(a), this application claims the benefit of earlier filing date and right of priority to Korean Application No. 10-2005-0003900, filed on Jan. 14, 2005.

BACKGROUND OF THE INVENTION

1. Field of the Invention

The present invention relates to a communications system and, more particularly, to a session invitation method and system for transmitting media information (or media components) to allow checking of a session in response to a session invitation or media information for determining the reasons for rejecting the invitation.

2. Description of the Related Art

In general, a PTx (Push-To-x) system is designed to provide an instant messenger service, similar to a walkie-talkie service. The PTx system provides a PTx service such as a PTT (Push-To-Talk) service, a PoC (Push-to-talk over Cellular) service, or the like.

In a typical PTx service, a user can speak into his terminal (e.g., a mobile phone) and one or more other persons can listen to the user through each of their terminals. At this time, the users have joined a session and are communicating with each other through the session.

According to a session invitation method in the typical PTx system, an invitee (an invited user) invited to the session has no information about the purpose of the established session nor any information about the participants. So in order to obtain information regarding the session, the invitee must directly join the session to receive the corresponding information, which causes much inconvenience to the invitee.

In addition, in the typical session invitation method, even if the invitee cannot join the session or does not want to join the session, because there is no method for the invitee to send his reasons for rejecting the invitation to an inviter (inviting user) of the session, the invitee may be repeatedly invited to the session by the inviter who does not have any information about why the invitee wishes to reject his invitation.

BRIEF DESCRIPTION OF THE INVENTION

Therefore, one object of the present invention is to provide a session invitation method and system whereby media information corresponding to session information is transmitted upon receiving a session invitation, such that an invitee can determine whether to join the session in advance.

Another object of the present invention is to provide a session invitation method and system whereby an invitee who is invited to a session transmits media information corresponding to a reason for rejection in order to reject the joining of the session so that an inviter can be aware of the reason for rejection of the invitee.

To achieve at least the above objects in whole or in parts, there is provided a session invitation system including: a first terminal for transmitting an invitation message including first media information for session invitation; and a second terminal for checking the first media information included in the invitation message and determining whether to accept the invitation.

To achieve at least these advantages in whole or in parts, there is further provided a session invitation system including a server for receiving a session invitation message or a reject message including a media component from a terminal, storing media content of the media component, adding a reference to the media content (namely, an address where the media content is stored) in the session invitation message or in the reject message, and transmitting it to a receiving side.

To achieve at least these advantages in whole or in parts, there is further provided a session invitation method including: transmitting by an inviting terminal first media information corresponding to information on a session for session invitation; and checking by an invitee the first media information received by his/her terminal (invited terminal) and determining whether to accept the invitation.

The session invitation method further including: transmitting by the invited terminal second media information corresponding to a reason for rejection to the invitation if the invitee rejects the invitation.

To achieve at least these advantages in whole or in parts, there is further provided a session invitation method including: receiving by a server a media component from a transmission terminal; and storing by the server media content of the media component, adding a reference to the media content in the media component, and transmitting the media component to a reception terminal.

To achieve at least these advantages in whole or in parts, there is further provided a session invitation method including: transmitting by an inviting terminal a message for session invitation (namely, invitation message) containing first media information to a server; transmitting by the server the invitation message to an invited terminal; outputting by the invited terminal first media information contained in the invitation message; inputting by an invitee whether to accept the invitation to a session to the invited terminal; and transmitting by the invited terminal an accept message if the session invitation is accepted.

The session invitation method further includes: transmitting by the invited terminal a reject message if the session invitation is rejected.

In the step of transmitting the reject message, the invited terminal transmits the reject message containing second media information corresponding to a reason for rejection.

The first media information contains at least one of the media content, namely, session information for session invitation and a reference to the media content.

The second media information contains at least one of media content corresponding to the reason for rejection and a reference to the media content.

The reference is a URL (Uniform Resource Locator) or a URI (Uniform Resource Identifier).

The step of transmitting the reject message includes: transmitting a 'provisional decline' message indicating that a reason for rejection to the session invitation will be transmitted within a certain time; and transmitting an SIP (Session Initiation Protocol) message containing the reason for rejection within the certain time.

To achieve at least these advantages in whole or in parts, there is further provided a session invitation method including: transmitting by an inviting terminal an invitation message for session invitation to a server; transmitting by the server the invitation message to an invited terminal; transmitting by the invited terminal a response message with respect to the invitation message and setting a media session with the inviting terminal; transmitting by the inviting terminal first media information to the server through an RTP (Real-time Transport Protocol); transmitting by the server the first media information to the invited terminal; outputting by the invited terminal the first media information; inputting by an invitee whether or not to accept the session invitation to the invited terminal; transmitting by the invited terminal an accept message if the session invitation is accepted; and setting up a session by the inviting terminal and the invited terminal.

The session invitation method further includes: transmitting by the invited terminal a reject message if the session invitation is rejected.

In the step of transmitting the reject message, the invited terminal transmits the reject message containing second media information corresponding to a reason for rejection.

The step of transmitting the reject message includes: transmitting a 'provisional decline' message indicating that a reason for rejection will be transmitted within a certain time; and transmitting an SIP message containing the second media information corresponding to the reason for rejection within the certain time.

The step of transmitting the reject message includes: transmitting a 'provisional decline' message indicating that a reason for rejection will be transmitted within a certain time; transmitting the reason for rejection by using an RTP within a certain time; and transmitting a media transmission completion message after transmission of the reason for rejection.

To achieve at least these advantages in whole or in parts, there is further provided a session invitation method, comprising: transmitting by a first terminal a reference to a media content for session invitation; receiving the reference to the media content by a second terminal; and transmitting a response information from the second terminal to the first terminal.

The step of transmitting the reference to the media content, comprises: storing by the first terminal the media content in its database or in an external storage unit; obtaining by the first terminal the reference to the media content; and transmitting by the first terminal the reference to the media content.

The step of transmitting the response information comprising: accessing by the second terminal the reference to media content; checking by the second terminal the media content; determining by the second terminal whether to accept the session invitation; and transmitting by the second terminal the response information to the first terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 illustrates the construction of an exemplary session invitation system in accordance with the present invention;

FIG. 3a illustrates the third embodiment of the session invitation method in accordance with the present invention;

DETAILED DESCRIPTION OF THE INVENTION

Figure 2A:
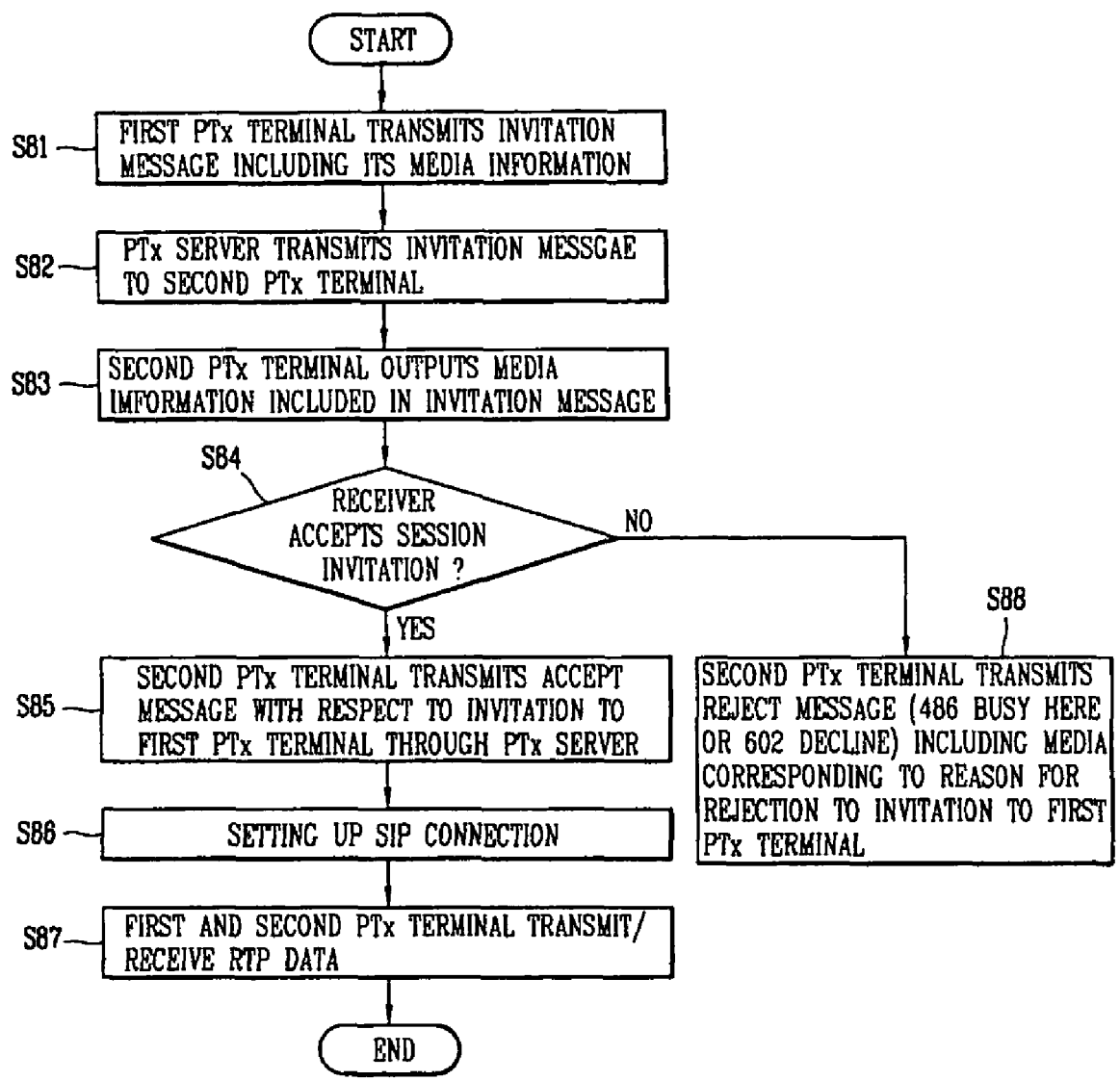
FIG. 2a illustrates the first embodiment of the session invitation method in accordance with the present invention.

Some embodiments of the present invention will now be described with reference to the accompanying drawings.

In the present invention, when an inviter (or an inviting user) invites users to a session, the inviter can transmit first media information (or first media component) corresponding to session information. If an invitee (or an invited user) rejects the invitation, the invitee can transmit second media information (or second media component) corresponding to a rejection for rejection to the inviter.

FIG. 1 illustrates the construction of a session invitation system in accordance with the present invention.

The session invitation system in accordance with the present invention is a PTx (Push-To-X) system, which provides media information when inviting a user to a session or when rejecting an invitation.

The session invitation system includes a first PTx terminal 100 for transmitting first media information (first media component) corresponding to session information when inviting to a session; a second PTx terminal 200 for transmitting second media information (second media component) corresponding to a reason for rejection when rejecting the invitation; and a PTx server 300 for controlling session setup, message transmission and transmission of the first and second media information between the first and second PTx terminals 100 and 200.

The first PTx terminal 100 can receive a session invitation and transmit the second media information corresponding to a reason for rejection when rejecting the invitation. Also, the second PTx terminal 200 can transmit the first media information corresponding to session information when inviting to a session.

The first PTx terminal 100 and the second PTx terminal 200 can have the same elements such as transmission/reception units 110 and 120, SIP systems 120 and 220, media output units 140 and 240, media information databases 130 and 230, and media information transcoding units 150 and 250.

The transmission/reception units 110 and 210 transmit/receive a message for a PTx service.

The SIP systems 120 and 220 set up (establish) or release a session, and in case of session invitation, the SIP systems 120 and 220 transmit an invitation message including the first media information to the transmission/reception units 110 and 120. When the session invitation is rejected, a reject message including the second media information is transmitted to the transmission/reception units 110 and 210. And in case of joining the session, the SIP systems 120 and 220 transmit/receive an RTP message or an RTCP (RTP Control Protocol) message to/from participants.

The SIP systems 120 and 220 include SIP connection setup/release units 121 and 221 and RTP/RTCP transmission units 123 and 223.

The SIP connection setup/release units 121 and 221 set up an SIP session, namely, a previous operation for opening an RTP/RTCP channel, and release the SIP session. The SIP connection setup/release units 121 and 221 add the first media information to the invitation message for inviting to a session and adds the second media information to a reject message for rejecting the session invitation.

When a session invitation is transmitted, the RTP/RTCP transmission units 123 and 223 transmit the first media information through an RTP message and receives a reception ACK message with respect to the first media information through an RTP, RTCP, SIP or FTP (File Transfer Protocol).

The media information databases 130 and 230 store the first and/or second media information.

If a format of the received media information is different from a media information format of the PTx terminals 100 and 200, the media information transcoding units 150 and 250 transcode the media information into a media information format which can be supported by the PTx terminals 100 and 200.

The PTx server 300 includes a transmission/reception unit 310, an SIP system 320 and a database 330. The transmission/reception unit 310 transmits/receives a message between the first and second PTx terminals 100 and 200.

The SIP system 320 controls the setup and releasing of a session between the first and second PTx terminals 100 and 200, and changes a type of the first or the second media information. Namely, if the first media information included in the invitation message transmitted from the first PTx terminal 100 or the second PTx terminal 200 has media content (namely, session information content), the SIP system 320 extracts and stores the media content (namely, the session information content), adds the first media information having a reference to the media content, namely, a reference (e.g., URL (Uniform Resource Locator) or URI (Uniform Resource Identifier)) to the media content (namely, the session information content) in the invitation message, and transfers the invitation message.

If the second media information included in the reject message transmitted from the first PTx terminal 100 or the second PTx terminal 200 has media content (namely, a reason for rejection content), the SIP system 320 extracts and stores the media content (namely, the reason for rejection content), adds the second media information having a reference (e.g., URL or URI) to the media content (reason for rejection content) in the reject message, and transfers the reject message.

The SIP system 320 includes an SIP connection setup/release unit 321 and an RTP/RTCP transmission unit 323. The SIP connection setup/release unit 321 informs about the reference to the session information content, namely, the URL or the URI.

In addition, the SIP connection setup/release unit 321 sets up or releases a session, checks the reference to the media content, changes the media content included in the session invitation message or in the reject message to the checked reference or the adds the checked reference in the session invitation message or in the reject message.

The RTP/RTCP transmission unit 323 controls the transmission of a message between the first and second PTX terminals 100 and 200.

The database 330 stores the session information content and the reason for rejection content. The database 330 can temporarily or permanently store a message transmitted by the first and second PTx terminals 100 and 200.

When establishment of a session begins, the first media information includes description content (namely, media content) including at least one or more of the following: reasons for invitation, information on an inviter, the number of invitees, information on invitee(s), and the like. The information on the inviter and the information on the invitees can include a name, nickname, gender, occupation, residential area, age, or the like.

If a session has already been established, the first media information includes description content (namely, media content) which contains at least one or more of a reason for invitation, information on the inviter, the number if invitees, information on the invitee(s), the number of current participants, and information on the current participant(s). The information on the inviter, the information on the invitees and the information on the current participant(s) may include a name, nickname, gender, occupation, residential area, age, or the like.

The type of the first media information may includes at least one or more of the following: text, images, videos, audio, and the like that the inviter wants to send.

The image can be a three-dimensional avatar, a two-dimensional avatar, an icon, or other types of graphical images.

The text can be data having media content (session information content including a reason for invitation) represented by characters and a reference to the media content (the session information content including the reason for invitation) stored in the PTx server. The reference to the media content (the session information content including the reason for invitation) can be the URL or the URI. The PTx server storing the media content (the session information content including the reason for invitation) can be the PTx server 300 or a different PTX server.

The first media information includes at least one or more of the media content corresponding to the session information content and the reference to the media content. Namely, the first media information can include only the media content, include both the media content and the reference to the media content, or include only the reference to the media content.

A type of the second media information can include at least one or more of the following: text, images, videos, audio, and the like that the inviter wants to send.

The image can be a three-dimensional avatar, a two-dimensional avatar, an icon or other types of graphical images.

The text refers to data representing the media content (content of a reason for rejection) in the form of characters and can have an XML (extended mark-up language) format. Also, the text can be a reference to the media content (the content of a reason for rejection). The reference can be the URL or the URI and the media content (the content of the reason for rejection) can be stored in the PTx server 300 or in a different PTx server.

Accordingly, the second media information includes at least one or more of the media content corresponding to the content of the reason for rejection and the reference to the media content.

The operation of the session invitation system constructed as described above will now be explained with reference to the accompanying drawings.

FIG. 2a illustrate a first embodiment of the session invitation method in accordance with the present invention. In the first embodiment of the session invitation method, media information is added in an invitation message and then transmitted.

First, for example, a transmission terminal (inviting terminal) is the first PTx terminal 100 and a reception terminal (invited terminal) is the second PTx terminal 200.

When establishment of a PTx session begins or the PTx session has already begun, the first PTX terminal 100 transits an invitation message (INVITE) to the second PTx terminal

200 in order to invite the second PTx terminal 200 to the PTx session (step S81). In this case, the invitation message includes the first media information corresponding to the session information. Description content and a type of the first media information were already mentioned previously, thus will be omitted hereafter.

The SIP system 120 of the first PTx terminal 100 adds the first media information in a header or a body of the invitation message, and then, transmits the invitation message to the PTx server 300 through the transmission/reception unit 110. At this time, the invitation message, which uses an SIP method, includes the first media information in the SIP header or the body.

Upon receiving the invitation message, the PTx server 300 transmits the invitation message to the second PTx terminal 200 (step S82).

Herein, a case where an invitation message including media content is transmitted from the first PTx terminal 100 to the second PTx terminal 200, a case where an invitation message including the media content is transmitted from the first PTx terminal 100 to the PTx server 300 and then the invitation message including a reference to the media content is transmitted from the PTx server 300 to the PTx terminal 200, and a case where an invitation message including media content and/or an invitation message including a reference to the media content is transmitted from the first PTx terminal 100 to the second PTx terminal 200 will be considered.

First, the case where the invitation message including the media content is transmitted from the first PTx terminal 100 to the second PTx terminal 200 will be described.

The SIP connection setup/release unit 121 of the first PTx terminal 100 adds the first media information, namely, the media content (session information content including a reason for invitation), provided from the media information database 130 in the invitation message and transmits the invitation message to the PTx server 300 through the transmission/reception unit 110, and then, the PTx server 300 transmits the invitation message including the media content to the second PTx terminal 200.

Second, the case where the invitation message including the first media information having the media content is transmitted from the first PTx terminal 100 to the PTx server 300, and the invitation message including a reference to the media content is transmitted from the PTx server 300 to the second PTx terminal 200 will be described.

The SIP connection setup/release unit 121 of the first PTx terminal 100 adds the first media information, namely, the media content (session information content including a reason for invitation), provided form the media information database 130 to the PTx server 300 through the transmission/reception unit 100. Then, the SIP connection setup/release unit 321 of the PTx server 300 stores the media content included in the invitation message in the database 330 or in an external storage unit and checks a reference to the media content. The reference to the media content is the URL or the URI. Herein, the SIP connection setup/release unit 321 of the PTx server 300 can store the entirety or a portion of the media content. The reference to the media content can be a reference to the entire media content or a reference to a portion of the media content.

The SIP connection setup/release unit 321 of the PTx server 300 adds the reference to the media content in the invitation message, and transmits the invitation message to the second PTx terminal 200. The first media information of the invitation message transmitted to the second PTx terminal 200 through the PTx server 300 can have only the reference to the media content, or can have both the media content and the reference to the media content.

Third, the case where the invitation message including the first media information having the media content and/or the reference to the media content is transmitted from the first PTx terminal 100 to the second PTx terminal 200 will now be described. The first PTx terminal 100 stores the entirety of the media content (session information content for session invitation) or a portion of the media content in the PTx server 300 or in an external storage unit, and obtains a reference to the media content stored in the PTx server 300 or the external storage unit. The first PTx terminal 100 replaces the media content in the invitation message with the reference to the stored media content and transmits the invitation message to the second PTx terminal 200 through the PTx server 300. The reference to the media content is the URL or the URI.

If the session information content for the session invitation, namely, the media content, is greater than a certain size (e.g., a maximum size of media information that can be added in the invitation message), the reference to the media content, but not the media content itself, is added in the invitation message and transmitted.

The first PTx terminal 100 can transmit an invitation message including the first media information having both a portion of the media content and a reference to the remaining media content.

Upon receiving the invitation message, the second PTx terminal 200 outputs the first media information included in the invitation message (step S83). Namely, the invitation message is inputted to the SIP system 220 through the transmission/reception unit 210 of the second PTx terminal 200, and the SIP system 220 extracts the first media information from the invitation message and outputs it to the media output unit 240. If a format of the first media information included in the invitation message is different from that of the media format supported by the second PTx terminal 200, the media information transcoding unit 250 can transcode the format of the first media information to the media format supported by the second PTx terminal 200.

Upon checking the first media information outputted through the second PTx terminal 200, an invitee determines whether to accept or reject the session invitation (step S84). Namely, if the first media information included in the invitation message is the reference to the media content, the invitee accesses the reference through the second PTx terminal 200, checks the media content (the session information content including the reason for invitation) and determines whether to accept or reject the session invitation (step S84). Here, the reference to the media content is the URL or the URI.

If the second media information included in the invitation message has partial media content and a reference to the remaining media content, the invitee can determine whether to accept the session invitation based on only the portion of the media content outputted through the second PTx terminal 200. And if the invitee wants to receive more information about the invitation to the session, he can access the reference outputted through the second PTx terminal 200.

For example, if the entirety of the media content includes a reason for invitation, information on the inviter, the number of invitees and information on the invitees, then the portion of the media content can include the reason for invitation and the information on the inviter.

If the invitee accepts the invitation, the second PTx terminal 200 transmits an accept message with respect to the invitation to the first PTx terminal 100 through the PTx server 300 (step S85). In this case, the accept message can be '200 OK'.

As the second PTx terminal 200 joins the session, the SIP session is connected among the first PTx terminal 100, the PTx server 300 and the second PTx terminal 200 (step S86) and the first PTx terminal 100 and the second PTx terminal 200 transmits and receives multimedia data, e.g., text, audio, videos, images, or the like, to each other (step S87). In this case, the multimedia data is transmitted through an RTP by the RTP/RTCP transmission unit 223 and a control signal used for controlling transmission of the data is transmitted through an RTCP.

If the invitee, which has checked the first media information outputted to the media output unit 240, does not accept the invitation, the second PTx terminal 200 transmits a reject message for rejecting the invitation. In this case, the reject message can include the second media information corresponding to a reason for rejection for rejecting the invitation. The second media information is inputted to a header or a body of the reject message. Description content and a type of the second media information have already been mentioned previously, thus will be omitted hereafter.

The second media information includes at least one or more of the media content corresponding to the reason for rejection and a reference to the media content.

If the media content (content of the reason for rejection) is greater than a certain size (e.g., a maximum size of the media information that can be included in the reject message), the reference to the media content, and not the media content itself, can be added to the reject message and transmitted.

The second PTx terminal 200 can add the second media information containing the media content corresponding to the reason for rejection in the reject message and transmit it to the first PTx terminal 100 through the PTx server 300.

The second PTx terminal 200 can add the reference (e.g., the URL or the URI) to the media content corresponding to the reason for rejection in the reject message and transmit it to the first PTx terminal 100 through the PTx server 300.

The second PTx terminal 200 can add the second media information containing both a portion of the media content corresponding to the reason for rejection and a reference to the remaining portion of the media content, in the reject message.

When the second PTx terminal 200 adds the second media information containing the media content corresponding to the reason for rejection in the reject message and transmits it, the PTx server 300 changes the second media information, namely, the media content (the reason for rejection) contained in the reject message, to the information of the reference to the media content, and transmits the reject message to the first PTx terminal 100. Namely, the PTx server 300 stores the media content in the database 330 or in an external storage unit, adds the reference (e.g., the URL or the URI) to the media content in the reject message, and transmits the reject message to the first PTx terminal 100. In addition, the PTx server 300 can add the second media information containing the portion of the media content and the reference to the remaining portion of the media content in the reject message and transmit it.

The reject message can include the reason for rejection to the invitation in a body of an existing SIP message such as a '486 Busy Here' message or a '602 Decline' message, or can be a message additionally defined for transmitting the reason for rejection. A procedure for transmitting the reject message will be described later.

With reference to FIG. 2a, the second PTx terminal 200 rejects the invitation, adds the first media information corresponding to the reason for rejection to the invitation in the SIP message such as the '486 Busy Here' message or the '602 Decline' message and transmits it (step S88).

Figure 2B:
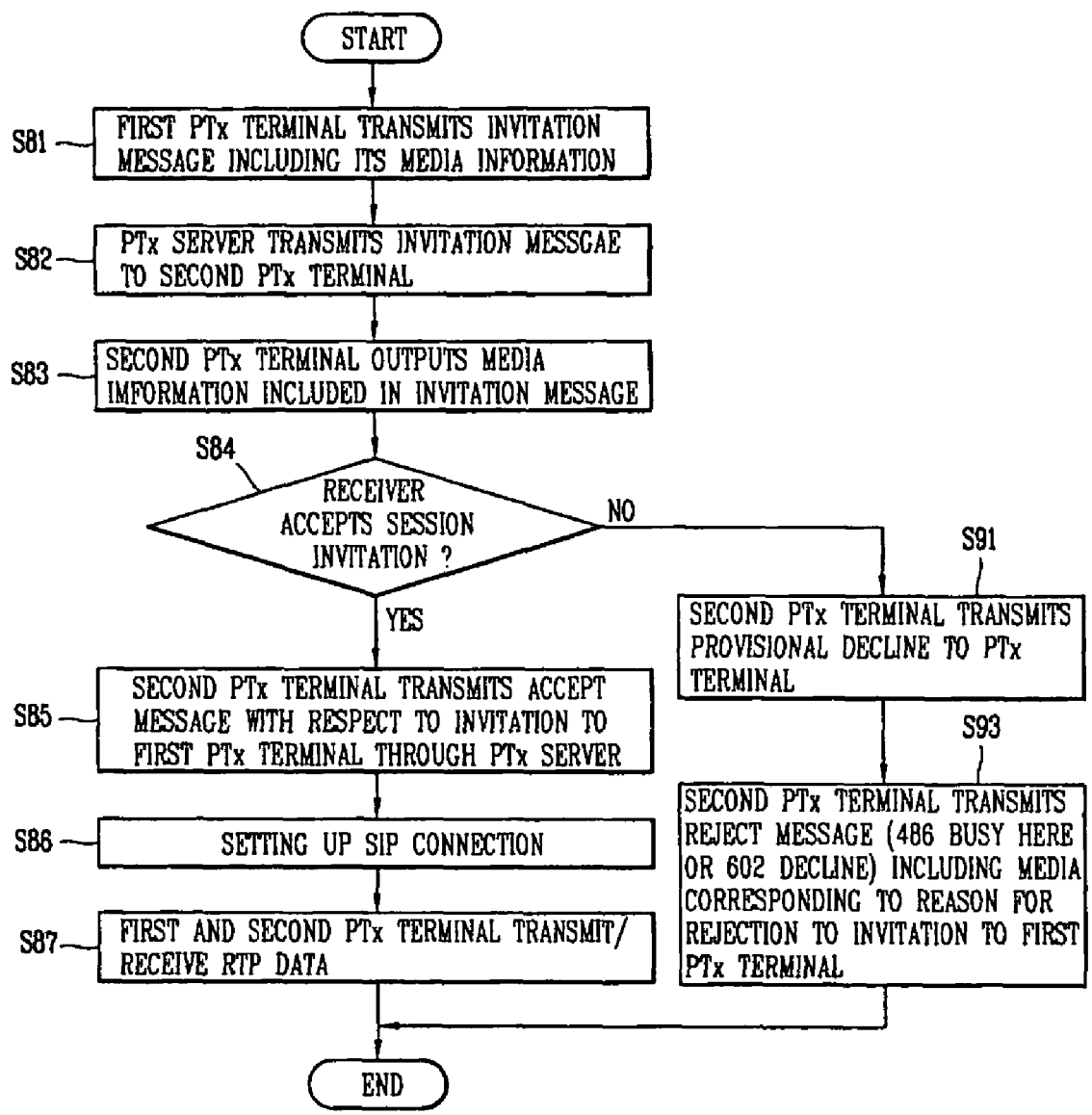
FIG. 2b illustrates the second embodiment of the session invitation method in accordance with the present invention.

FIG. 2b illustrates the second embodiment of the session invitation method in accordance with the present invention.

In the second embodiment of the present invention, a process for transmitting a reject message when the PTx session invitation is not accepted is different from that of the first embodiment as shown in FIG. 5a.

Herein, descriptions for the same process as that of the first embodiment will be omitted and a process in which an invitee, which has checked media information outputted to the media output unit, does not accept the invitation will be described.

When the invitee rejects the invitation from the first PTx terminal 100, the second PTx terminal 200 transmits a 'Provisional Decline (PRODEC)' message to the first PTx terminal 100 (step S91). At this time, the 'Provisional Decline' message can include the content that the session invitation is rejected and a reason for rejection to the invitation will be transmitted within a certain time or indicate that the session invitation is rejected and a reason for rejection to the invitation will be transmitted within a certain time.

After transmitting the 'Provisional Decline' message, the second PTx terminal 200 adds second media information corresponding to the reason for rejection to the invitation in an SIP message such as a '486 Busy Here' or a '602 Decline' message, and transmits it (step S93).

FIG. 3a illustrates the third embodiment of the session invitation method in accordance with the present invention.

In the third embodiment of the session invitation method, when an inviter invites invitees to a session, the inviter transmits first media information corresponding to session information to the invitees by using an RTP.

As an example, a case where the inviter (namely, a transmission terminal) is a first PTx terminal 100 and the invitee (namely, a reception terminal) is a second PTx terminal 200 will be described.

When establishment of a PTx session begins or when the PTx session has already been established, the first PTx terminal 100 transmits an invitation message (INVITE) to the second PTx terminal 200 in order to invite the second PTx terminal 200 to the PTx session (step S101). In this case, the invitation message includes a parameter indicating that the first media information will be additionally transmitted. Namely, the invitation message includes an introduction media parameter allowing the reception terminal to open a 'media session' and receive the first media information transmitted through the RTP. Accordingly, upon receiving the parameter, the reception terminal can receive the first media information through the RTP before determining joining the session and easily determine whether to join the session without incurring charges or fees to a receiver.

Description content and a type of the first media information have already been mentioned above, thus will be omitted hereafter.

The invitation message is transmitted to the second PTx terminal 200 through the PTx server 300, and the second PTx terminal 200 transmits a response message with respect to the invitation message, whereby a media session for receiving the first media information is connected between the first PTx terminal 100 and the second PTx terminal 200 (step S102). In this case, the response message indicates that a decision as to whether to join the session will be held until the first media information transmitted by the first PTx terminal 100 is checked and the media session for receiving the first media information is connected. Namely, the response message does not indicate a decision for joining the invited PTx session. As the response message, a '180 Ringing' message, a '202 Accepted' message, or a '183 Session Progress' can be used.

Upon receiving the response message, the first PTx terminal 100 transmits the first media information with respect to the session to the PTx server 300 by using the media session (step S103). Namely, the RTP/RTCP transmission unit 123 of the first PTx terminal 100 transmits the first media information provided from the media information database 130 to the PTx server 300 through the transmission/reception unit 110 by using the RTP.

Upon receiving the first media information, the PTx server 300 transmits an ACK message with respect to reception of the first media information to the first PTx terminal 100 by using the RTP or the RTCP or the SIP or the FTP (step S104). Namely, the first media information received by the PTx server 300 is inputted to the RTP/RTCP transmission unit 323 of the SIP system through the transmission/reception unit 310, and the RTP/RTCP transmission unit 323 transmits the ACK message with respect to reception of the first media information to the first PTx terminal 100 through the transmission/reception unit 310 by using the RTCP. At this time, if the first PTx terminal 100 fails to receive the ACK message within a certain time, the first PTx terminal 100 regards that transmission of the first media information has failed, and can re-transmit the media information.

Upon receiving the first media information, the PTx server 300 transmits the first media information to the second PTx terminal 200 by using the RTP (step S105), and, upon receiving the first media information, the second PTx terminal 200 transmits an ACK message with respect to reception of the first media information to the PTx server 300 by using the RTCP (step S106). At this time, the RTP/RTCP transmission unit 323 of the PTx server 300 transmits the first media information by using the RTP through the transmission/reception unit 310. When the first media information is inputted to the RTP/RTCP transmission unit 223 through the transmission/reception unit 210 of the second PTx terminal 200, the RTP/RTCP transmission unit 223 of the second PTx terminal 200 transmits an ACK message with respect to the reception of the first media information to the PTx server 300 by using the RTP or the RTCP or the SIP or the FTP through the transmission/reception unit 210.

The first PTx terminal 100 can transmit a message indicating that transmission of the desired first media information has been completed, by using the RTP or the RTCP or the SIP message. Namely, in order to inform about a time point at which the transmission of the media information has been completed, the transmission terminal can transmit a termination signal using the message to the reception terminal.

The first media information which has been received by the SIP system 220 of the second PTx terminal 200 is outputted through the media output unit 240 (step S107), and upon checking the first media information outputted to the media output unit 240, the invitee can determine whether to accept the session invitation (step S108). At this time, if a format of the first media information is different from a format supported by the second PTx terminal 200, the media information transcoding unit 250 transcodes the first media information into a media format supported by the second PTx terminal 200 and outputs it.

When the invitee accepts the session invitation, the second PTx terminal 200 transmits an accept message with respect to the invitation to the first PTx terminal 100 through the PTx server 300 (step S109), whereby the second PTx terminal 200 can join the session (step S110). In this case, the accept message can be '200 OK'.

If the invitee does not accept the session invitation, the second PTx terminal 200 transmits a reject message with respect to the invitation. In this case, the reject message includes second media information corresponding to a reason for rejection to the invitation. Description content and a type of the second media information corresponding to the reason for rejection has been mentioned previously, thus will be omitted hereafter.

The reject message can include the second media information corresponding to the reason for rejection to the invitation in a body of an existing SIP message such as a '486 Busy Here' message or a '602 Decline' message, or can be a message additionally defined for transmitting the second media information. A procedure for transmitting the reject message will be described later.

With reference to FIG. 3*a*, the second PTx terminal 200 rejects the invitation and, at the same time, adds the second media information corresponding to the reason for rejection to the invitation in the SIP message such as the '486 Busy Here' message or the '602 Decline' message and transmits it (step S111).

Figure 3B:
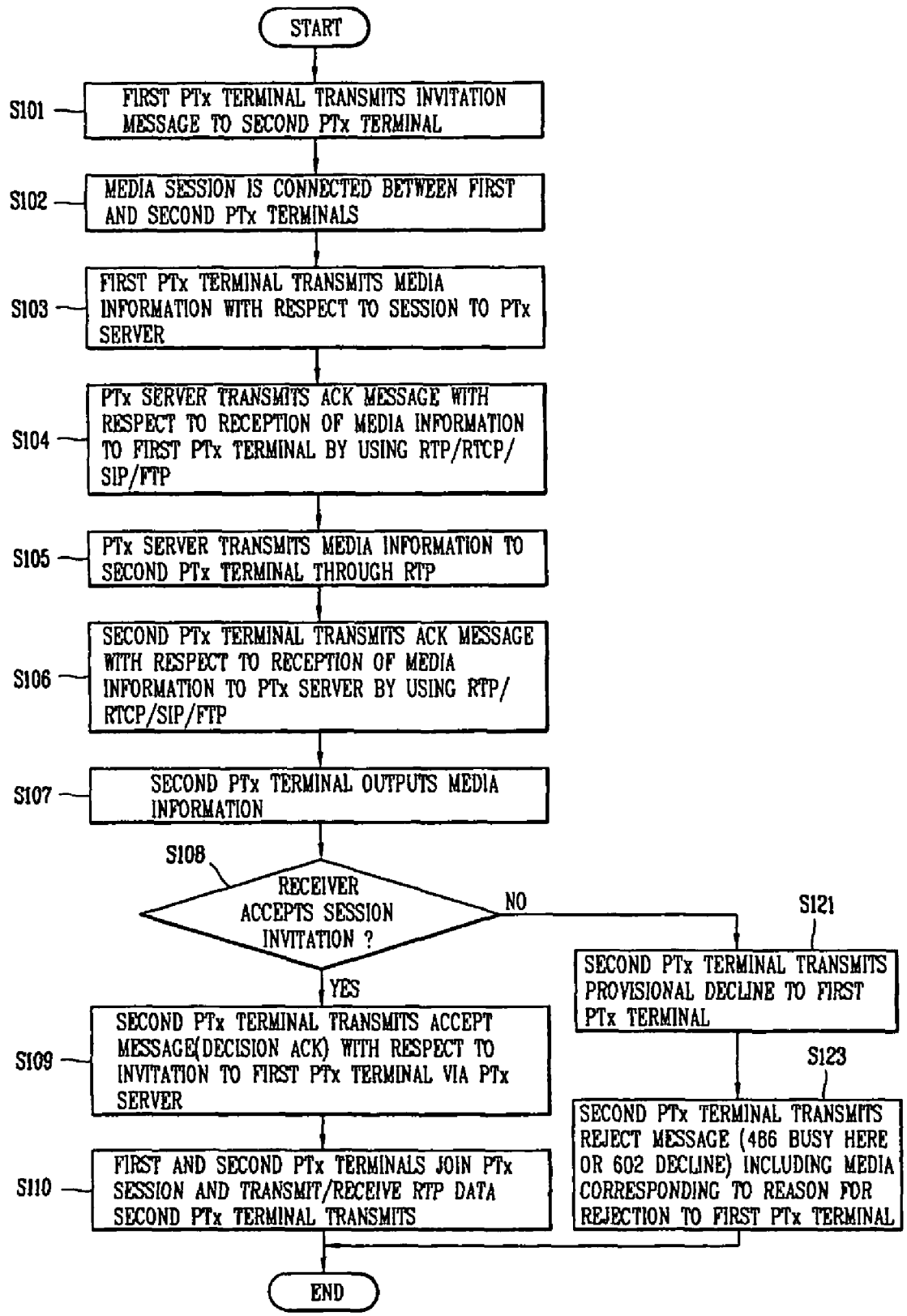
FIG. 3b illustrates the fourth embodiment of the session invitation method in accordance with the present invention.

FIG. 3*b* illustrates the fourth embodiment of the session invitation method in accordance with the present invention.

In the fourth embodiment of the present invention, a process for transmitting a reject message when the PTx session invitation is not accepted is different from that of the third embodiment as shown in FIG. 3*a*.

Herein, descriptions for the same process as that of the third embodiment will be omitted and a process in which an invitee, which has checked first media information outputted to the media output unit, rejects the invitation will be described.

When the invitee rejects the session invitation transmitted from the first PTx terminal 100, the second PTx terminal 200 of the invitee transmits a 'Provisional Decline (PRODEC)' message including the content that the session invitation is rejected and a reason for rejection to the invitation will be transmitted within a certain time or indicating that the session invitation is rejected and a reason for rejection to the invitation will be transmitted within a certain time, to the first PTx terminal 100 (step S121).

After transmitting the 'Provisional Decline' message, the second PTx terminal 200 adds second media information corresponding to the reason for rejection to the invitation in an SIP message such as a '486 Busy Here' or a '602 Decline' message, and transmits it (step S123).

Description content and a type of the second media information have been mentioned previously, thus will be omitted hereafter.

Figure 3C:
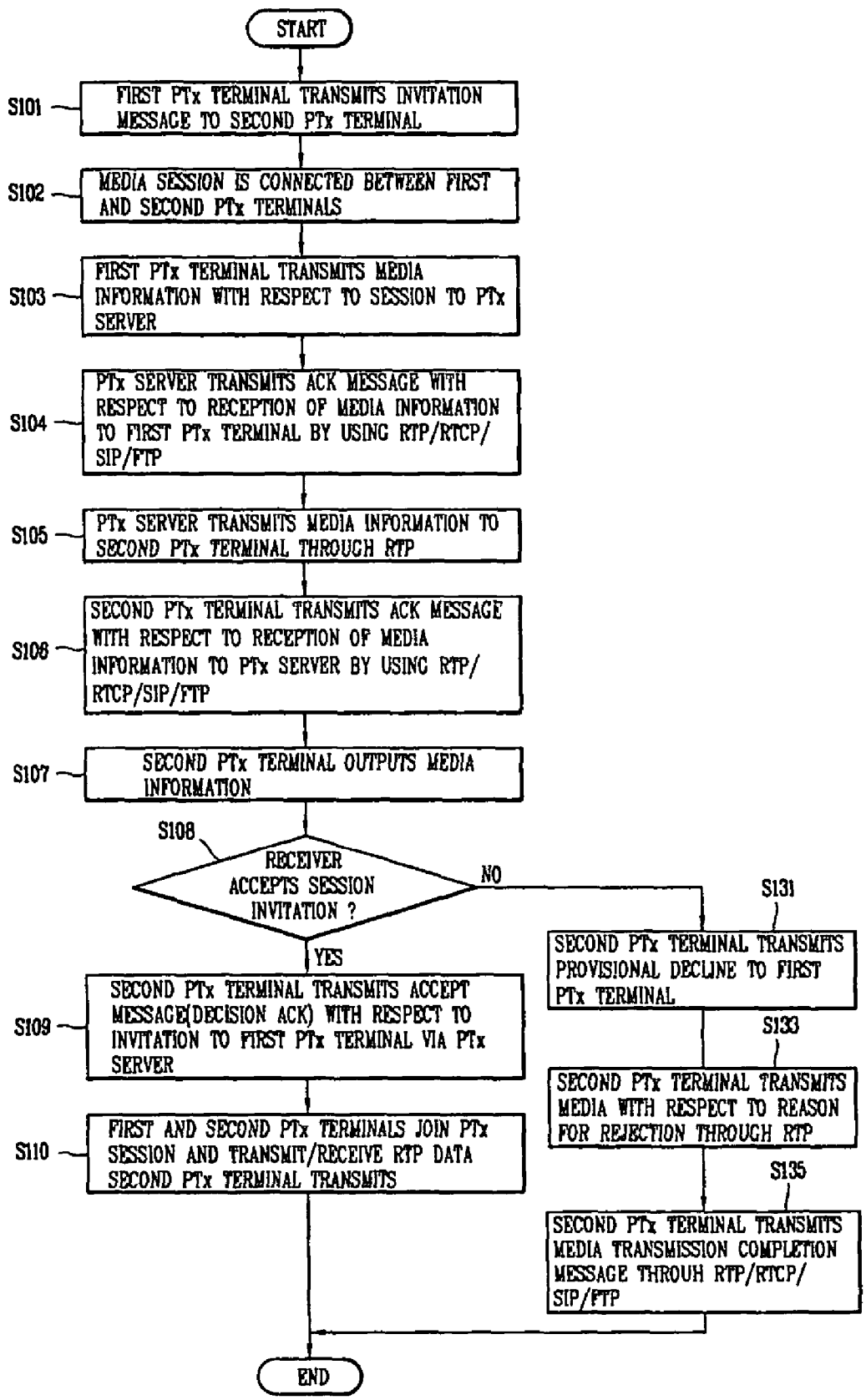
FIG. 3c illustrates the fifth embodiment of the session invitation method in accordance with the present invention.

FIG. 3*c* illustrates the fifth embodiment of the session invitation method in accordance with the present invention.

In the fifth embodiment of the present invention, a process for transmitting a reject message is different from those of the third and fourth embodiments.

Herein, descriptions for the same process as those of the third and fourth embodiments will be omitted, and a process in which an invitee, which has checked second media information, rejects the invitation will be described.

When the invitee rejects the session invitation transmitted from the first PTx terminal 100, the second PTx terminal 200 of the invitee transmits a 'Provisional Decline (PRODEC)' message including content that the session invitation is rejected and a reason for rejection to the invitation will be transmitted within a certain time or indicating that the session invitation is rejected and a reason for rejection to the invitation will be transmitted within a certain time, to the first PTx terminal 100 (step S131).

After transmitting the 'Provisional Decline' message, the second PTx terminal 200 adds second media information corresponding to the reason for rejection to the invitation by using the RTP (step S133), and then, after the transmission of the second media information corresponding to the reason for rejection is completed, the second PTx terminal 200 transmits a media transmission completion message to the first PTX terminal 100 by using the RTP or the RTCP or the SIP or the FTP (step S135).

To sum up, with reference to FIGS. 2a, 2b, 3a, 3b and 3c, the process in which the reception terminal transmits the reject message is as follows.

First, immediately when the invitee rejects joining the session, the second media information corresponding to the reason for rejection which is inputted by the invitee or previously stored is added in a header or to the body of the SIP message such as the '486 Busy Here' or the '602 Decline' message and then transmitted. Actually, the '486 Busy Here' message is generally used to be transmitted when the reception terminal is currently joining a different session or cannot join the session because it is performing voice communications. But, in the present invention, the '486 Busy Here' message can be transmitted in other cases as well.

Second, the message including the content that the session invitation is rejected and the reason for rejection to the session invitation will be transmitted within a certain time (namely, the Provisional Decline (PRODEC) message) is transmitted, and then, the SIP message including the second media information corresponding to the reason for rejection of the invitee is transmitted within the certain time. Namely, the rejection with respect to the session invitation and the reason for rejection with respect to the session invitation can be transmitted through separate messages. In this case, the SIP message is the '486 Busy Here' message or the '602 Decline' message.

Third, after the 'Provisional Decline' message is transmitted and the second media information corresponding to the reason for rejection is transmitted by using the RTP within the certain time, the media transmission completion message indicating a transmission completion time point of the second media information is transmitted by using the RTP, the RTCP, the SIP or the FTP. In this case, the method in which the invitee transmits the second media information by using the RTP can be applied to the case where the first media information corresponding to the session information transmitted for session invitation is received by using the RTP.

Figures 4, 5:
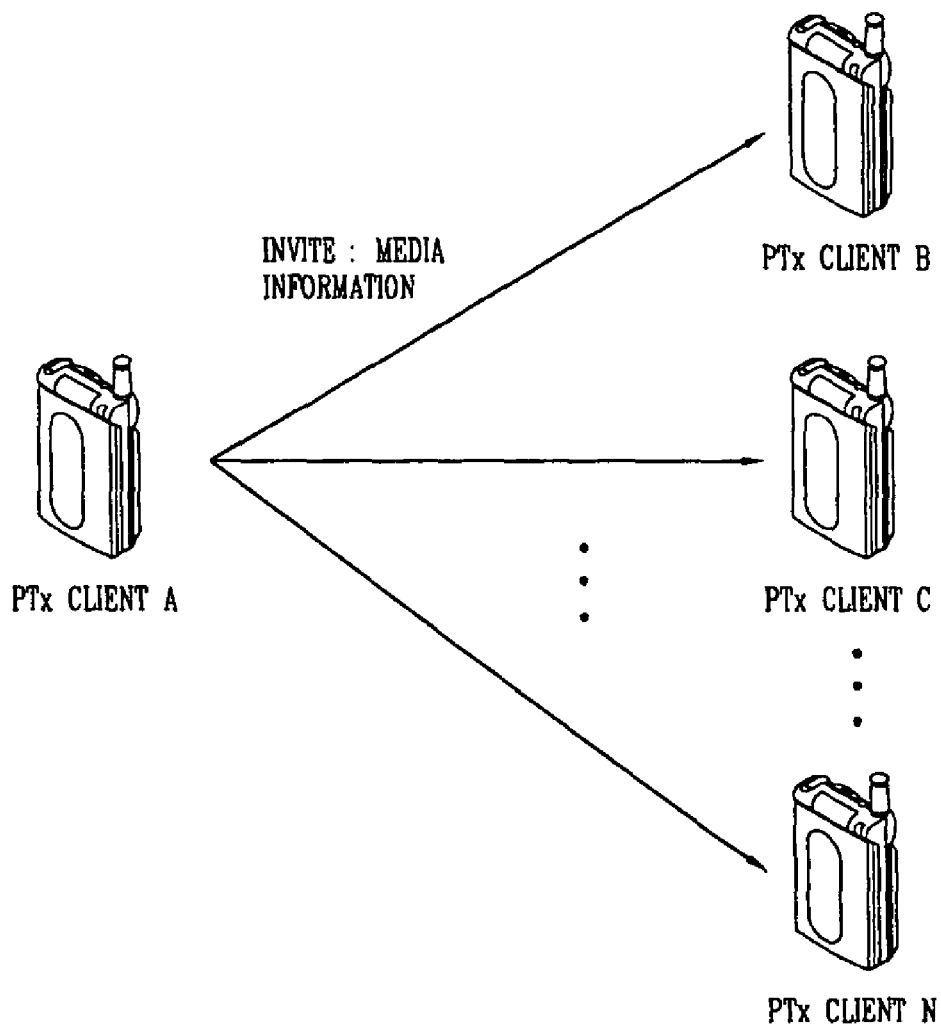
FIG. 4 illustrates an exemplary embodiment of an SIP message including media information corresponding to a reason for rejection.
FIG. 5 illustrates an exemplary operation for initiating a session according to the session invitation method in accordance with the present invention.

FIG. 4 illustrates an exemplary embodiment of an SIP message including second media information corresponding to the reason for rejection. The SIP message, especially, the second media information, shown in FIG. 4 is expressed in an XML format. Description content and a type of the second media information have been mentioned previously, thus will be omitted hereafter.

A different embodiment of the session invitation method in accordance with the present invention will now be described with reference to FIG. 5.

To begin a PTx session, a PTx user 'A' selects his friends or unfamiliar PTx users from his/her phone book. The PTx user 'A' creates and sends a PTx session invitation with multimedia content. The multimedia content can be automatically contained in the invitation (invitation message). The multimedia content may contain some description information, for example, a reason for invitation, information on an inviter, who else is being invited, a name/nickname of the invited, an image, video or audio that the inviter wants to send.

The PTx users receive the invitation of the PTx user 'A' with the multimedia content, and determine whether to join the PTx session. If a PTx user 'B' is not interested in the invitation, the user 'B' decides not to join the PTx session and sends a '4xx' message to the inviter (the PTx user 'A').

Still another embodiment of the session invitation method in accordance with the present invention will now be described with reference to FIG. 5. To begin the PTx session, a PTx user 'A' selects his friends or other PTx users from his/her phone book. The PTx user 'A' creates and sends a PTx session invitation with multimedia content. The multimedia content can be automatically contained in the invitation (invitation message). The multimedia content may contain some description information, for example, a reason for invitation, information on an inviter, who else is being invited, a name/nickname of the invited, an image, video or audio that the inviter wants to send.

The PTx users receive the invitation of the PTx user 'A' with the multimedia content, and determine whether to join the PTx session. If a PTx user 'C' is interested in the invitation, user 'C' decides to join the PTx session and sends a '2xx' OK message to the inviter (PTx user 'A'). Accordingly, the PTx users 'A' and 'C' can communicate during the PTx session.

Figure 6:
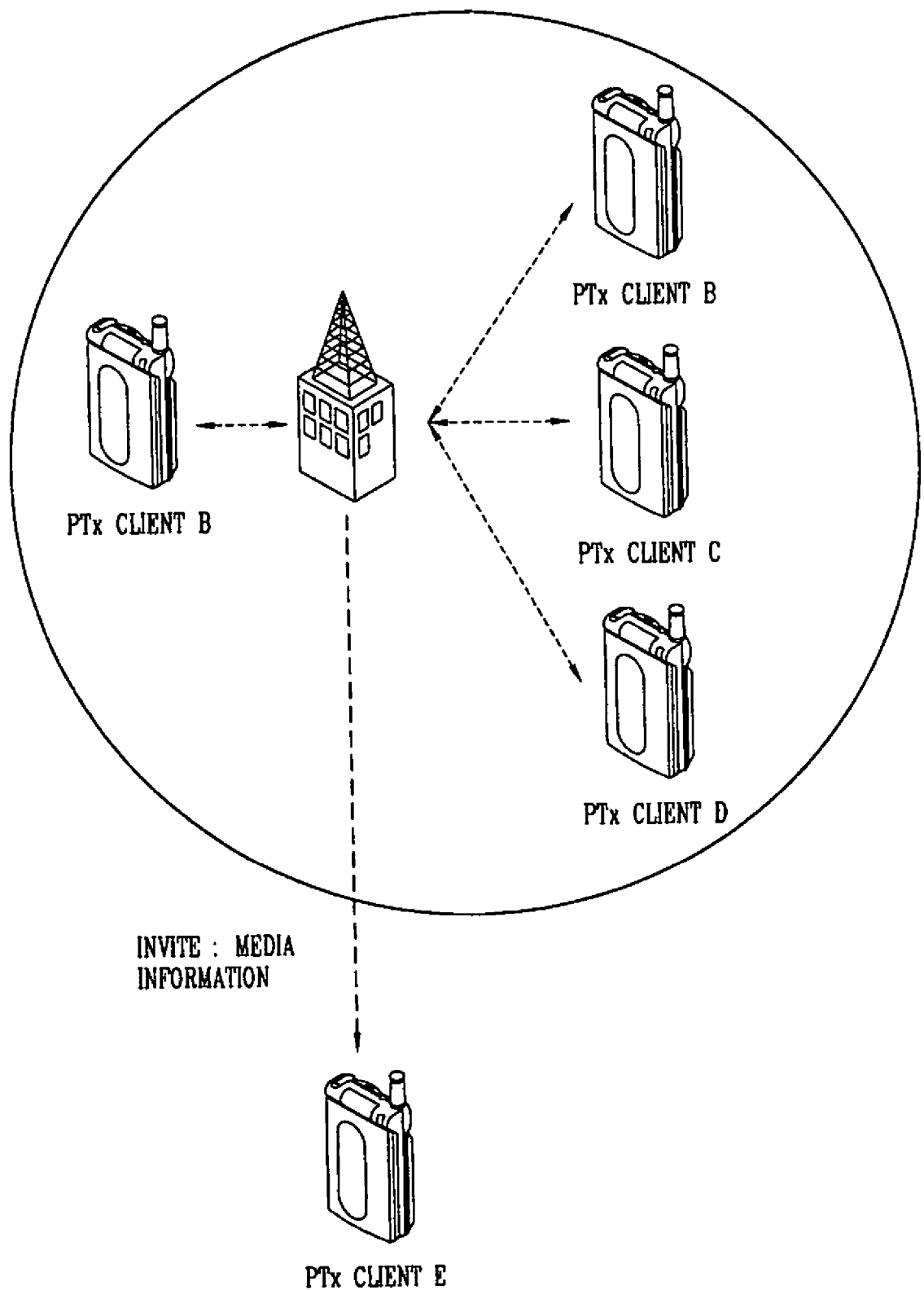
FIG. 6 illustrates an exemplary operation of inviting to a pre-set session according to the session invitation method in accordance with the present invention.

Still another embodiment of the session invitation method will now be described with reference to FIG. 6.

During a PTx session among the PTx users 'A', 'B', 'C' and 'D', the PTx user 'A' invites a PTx user 'E' and the PTx user 'E' accepts the invitation of the PTx user 'A'. The invitation of the PTx user 'A' includes multimedia content. The multimedia content includes information on the inviter, what the inviter invites for, who else are in the current PTx session, and an image, video or audio that the inviter wants to send.

A PTx user 'E' is doing some work but feels more interested in the PTx session invitation, so the PTx user 'E' decides to join the session. Accordingly, the PTx users 'A', 'B', 'C', 'D' and 'E' can communicate during the PTx session.

As mentioned above, the session invitation method and system in accordance with the present invention have many advantages.

That is, first, when the users are invited to a session, the inviter (or the inviting user) transmits the first media information (or the media component(s)) corresponding to session information, so that the invitee can check information on the session in advance and determine whether to join the session before actually joining the session.

Second, some users (such as, the PTx users 'B', 'C' and 'D') can obtain more information on the PTx session before accepting or rejecting the session invitation.

Third, when an invitee (or the invited user) rejects the session invitation, the invitee can transmit the second media information corresponding to the reason for rejection to the inviter, so that the inviter can check the reason for rejection of the invitee.

Fourth, without actually joining the session, the invitee can determine whether or not to join the session, and because the inviter does not need to repeatedly transmit the session invitation to the invitee who rejects the session invitation, the network traffic can be reduced.

The present invention provides a group communications terminal, comprising: a transceiver to send and receive data to and from other users via a group communications network; a memory to store the data; and a processor cooperating with the transceiver and the memory to perform the steps of, sending a session invitation message to one or more users via the group communications network, the message including media components indicating a reason for invitation and information about one or more participants of the session; and receiving an acceptance or a rejection to the session invitation, the rejection including one or more reasons for rejection.

Also, the present invention provides a group communications terminal, comprising: a transceiver to send and receive data to and from other users via a group communications network; a memory to store the data; and a processor cooperating with the transceiver and the memory to perform the steps of, receiving a session invitation message from a user via the group communications network, the message including media components indicating a reason for invitation and information about one or more participants of the session; checking the reason for invitation and information about one or more participants to determine whether to accept or reject the session invitation; and sending an acceptance or a rejection to the session invitation, the rejection including one or more reasons for rejection.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of performing a session based communication by a mobile terminal that operates as an inviter and an invitee of a SIP (Session Initiation Protocol) session, the method comprising:
    when the mobile terminal operates as the inviter of a first SIP session,
        sending a first session invitation message to an invitee mobile terminal through use of a SIP method via a server, the first session invitation message including at least one reason for the session invitation as description information and is used for establishing the first SIP session with the invitee mobile terminal via the server,
        receiving a response from the invitee mobile terminal that accepted the first session invitation message as a result of considering the description information,
        establishing the first SIP session with the invitee mobile terminal, and
        transmitting multimedia data to the invitee mobile terminal using real-time transport protocol (RTP) through the established first SIP session,
        wherein the description information is included in a SIP header or SIP body of the first session invitation message, and the description information is in the form of text; and
    when the mobile terminal operates as the invitee of a second SIP session,
        receiving a second session invitation message from an inviter mobile terminal through use of a SIP method via a server, the second session invitation message including description information and is used for establishing the second SIP session with the invitee mobile terminal via the server,
        sending a response to the inviter mobile terminal that sent the second session invitation message as a result of considering the description information,
        establishing the second SIP session with the inviter mobile terminal, and
        receiving multimedia data from the inviter mobile terminal using RTP through the established second SIP session,
        wherein the description information is included in a SIP header or SIP body of the second session invitation message, and the description information is in the form of text.

2. The method of claim 1, wherein the description information, of the first session invitation message and the second session invitation message, comprises at least one of a reason for a session invitation, information about the inviter, a total number of invited users, and information about one or more invited users.

3. The method of claim 1, wherein the description information, of the first session invitation message and the second session invitation message, comprises information that the inviter wants to send to at least one invited user.

4. The method of claim 1, wherein the description information, of the first session invitation message and the second session invitation message, further includes an image, video or audio.

5. The method of claim 1, wherein the description information, of the first session invitation message and the second session invitation message, further includes at least media content corresponding to session information or a reference to the media content.

6. The method of claim 5, wherein the reference is a Uniform Resource Locator or a Uniform Resource Identifier.

7. The method of claim 1, wherein the sending of the first and second session invitation messages support PTx (push-to-x) services.

8. The method of claim 1, further comprising:
    sending, in response to receiving the second session invitation message, a reject message including reasons for rejecting the second session invitation message.

9. A terminal that operates as an inviter and an invitee of a SIP (Session Initiation Protocol) session and performs a session based communication, the terminal comprising:
    a transceiver to send and receive signals; and
    a processor that cooperates with the transceiver to perform a procedure of sending a session invitation and a procedure of receiving a session invitation such that,
    when the mobile terminal operates as the inviter of first SIP session, the processor is configured to:
        send a first session invitation message to an invitee mobile terminal through use of a SIP method via a server, the first session invitation message including at least one reason for the session invitation as description information and is used for establishing the first SIP session with the invitee mobile terminal via the server,
        receive a response from the invitee mobile terminal that accepted the first session invitation message as a result of considering the description information,
        establish the first SIP session with the invitee mobile terminal, and
        transmit multimedia data to the invitee mobile terminal using real time transport protocol (RTP) through the established first SIP session,
        wherein the description information is included in a SIP header or SIP body of the first session invitation message, and the description information is in the form of text; and
    when the mobile terminal operates as the invitee of a second SIP session, the processor is further configured to
        receive a second session invitation message from an inviter mobile terminal through use of a SIP method via a server, the second session invitation message including description information and is used for establishing the second SIP session with the invitee mobile terminal via the server, send a response to the inviter mobile terminal that sent the second session invitation message as a result of considering the description information, establish the second SIP session with the inviter mobile terminal, and receive multimedia data from the inviter mobile terminal using RTP through the established second SIP session, wherein the description information is included in a SIP header or SIP body of the second session invitation message, and the description information is in the form of text.

10. The terminal of claim 9, wherein the description information, of the first session invitation message and the second session invitation message, comprises at least one of a reason for a session invitation, information about the inviter, a total number of invited users, and information about one or more invited users.

11. The terminal of claim 9, wherein the description information, of the first session invitation message and the second session invitation message, comprises information that the inviter wants to send to at least one invited user.

12. The terminal of claim 9, wherein the description information, of the first session invitation message and the second session invitation message, further includes an image, video or audio.

13. The terminal of claim 9, wherein the description information, of the first session invitation message and the second session invitation message, further includes at least media content corresponding to session information or a reference to the media content.

14. The terminal of claim 13, wherein the reference is a Uniform Resource Locator or a Uniform Resource Identifier.

15. The terminal of claim 9, wherein the processor and the transceiver are configured to support PTx (push-to-x) services.

16. The terminal of claim 9, wherein the processor and the transceiver are configured to send, in response to receiving the second session invitation, a reject message including reasons for rejecting the second session invitation message.

* * * * *